United States Patent
Chen et al.

(10) Patent No.: US 12,548,758 B2
(45) Date of Patent: Feb. 10, 2026

(54) NEGATIVE ELECTRODE PLATE, ELECTROCHEMICAL APPARATUS, AND ELECTRONIC APPARATUS

(71) Applicant: Ningde Amperex Technology Limited, Ningde (CN)

(72) Inventors: Zhihuan Chen, Ningde (CN); Daoyi Jiang, Ningde (CN); Ting Yi, Ningde (CN); Hang Cui, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 678 days.

(21) Appl. No.: 17/951,570

(22) Filed: Sep. 23, 2022

(65) Prior Publication Data

US 2023/0021755 A1  Jan. 26, 2023

Related U.S. Application Data

(63) Continuation of application No. PCT/CN2020/081306, filed on Mar. 26, 2020.

(51) Int. Cl.
*H01M 4/134* (2010.01)
*H01M 4/02* (2006.01)
(Continued)

(52) U.S. Cl.
CPC .......... *H01M 4/134* (2013.01); *H01M 4/386* (2013.01); *H01M 4/483* (2013.01);
(Continued)

(58) Field of Classification Search
None
See application file for complete search history.

(56) References Cited

U.S. PATENT DOCUMENTS

| | | |
|---|---|---|
| 9,583,278 B2 | 2/2017 | Miyauchi et al. |
| 10,374,225 B2 | 8/2019 | Yamamoto et al. |

(Continued)

FOREIGN PATENT DOCUMENTS

| | | |
|---|---|---|
| CN | 104205442 A | 12/2014 |
| CN | 109075376 A | 12/2018 |

(Continued)

OTHER PUBLICATIONS

International Search Report dated Dec. 28, 2020, issued in counterpart International Application No. PCT/CN2020/081306 (2 pages).

*Primary Examiner* — Kevin M Bernatz
(74) *Attorney, Agent, or Firm* — WHDA, LLP (57) ABSTRACT

A negative electrode plate includes a current collector and an active substance layer provided on the current collector, where the active substance layer includes a silicon-based material, and a proportion by mass of element silicon in the active substance layer has a minimum value X1 and a maximum value X2 among different locations of a same area size, where a value of X1/X2 is M, and M≥0.7; and a weight loss rate of the active substance layer under thermogravimetric (TG) analysis within 800° C. has a minimum value Y1 and a maximum value Y2 among different locations of a same area size, where a value of Y1/Y2 is N, and N≥0.7. In this disclosure, the silicon-based material and a binder in the active substance layer are uniformly dispersed, improving C-rate performance and cycling performance of the electrochemical apparatus and reducing swelling of an electrode assembly.

15 Claims, 3 Drawing Sheets

(51) Int. Cl.
*H01M 4/38* (2006.01)
*H01M 4/48* (2010.01)
*H01M 4/62* (2006.01)

(52) U.S. Cl.
CPC ............... *H01M 2004/021* (2013.01); *H01M 2004/027* (2013.01); *H01M 4/622* (2013.01); *H01M 4/625* (2013.01)

(56) References Cited

U.S. PATENT DOCUMENTS

| | | | |
|---|---|---|---|
| 2015/0187516 A1 | 7/2015 | Miyauchi et al. | |
| 2019/0140261 A1 | 5/2019 | Yamamoto et al. | |
| 2019/0157664 A1* | 5/2019 | Yamamoto | H01M 50/119 |
| 2020/0365895 A1* | 11/2020 | Sawada | C01B 32/225 |
| 2021/0184219 A1* | 6/2021 | Sawada | H01M 4/666 |
| 2022/0069296 A1* | 3/2022 | Zhu | H01M 10/0525 |
| 2023/0343944 A1* | 10/2023 | Chen | H01M 4/587 |

FOREIGN PATENT DOCUMENTS

| | | |
|---|---|---|
| CN | 109075377 A | 12/2018 |
| CN | 110797520 A | 2/2020 |
| CN | 110890531 A | 3/2020 |
| CN | 110911635 A | 3/2020 |
| JP | 6016573 B2 | 10/2016 |

* cited by examiner

NEGATIVE ELECTRODE PLATE, ELECTROCHEMICAL APPARATUS, AND ELECTRONIC APPARATUS

CROSS REFERENCES TO THE RELATED APPLICATIONS

The present application is a continuation application of PCT application PCT/CN2020/081306, filed on Mar. 26, 2020, the disclosure of which is hereby incorporated by reference in its entirety.

TECHNICAL FIELD

This disclosure relates to the field of electronics technologies, and in particular, to a negative electrode plate, an electrochemical apparatus, and an electronic apparatus.

BACKGROUND

In a negative electrode of a mixture of silicon and graphite, dispersion uniformity of silicon is crucial to electrical performance. If silicon is ununiformly dispersed in graphite, ununiform current distribution will occur in a charging/discharging process of an electrochemical apparatus. A silicon accumulation zone experiences a huge volume change, up to more than three times, during charging/discharging cycling, causing silicon particles to become power. This leads to repeated regeneration of the solid electrolyte interface (SEI, solid electrolyte interface) membrane, resulting in low coulombic efficiency, poor electrical contact, increased polarization, and serious electrolyte consumption. Consequently, cycling performance and C-rate performance become sharply degraded. In addition, as the silicon accumulation zone swells much during cycling, the separator is likely to break, causing safety hazards.

SUMMARY

In view of the foregoing disadvantages of the prior art, this disclosure is intended to improve distribution uniformity of a silicon-based material in a carbon material.

This disclosure provides a negative electrode plate, including a current collector and an active substance layer provided on the current collector, where the active substance layer includes a silicon-based material, and a proportion by mass of element silicon in the active substance layer has a minimum value X1 and a maximum value X2 among different locations of a same area size, where a value of X1/X2 is M, and M≥0.7; a weight loss rate of the active substance layer under thermogravimetric (TG) analysis within 800° C. has a minimum value Y1 and a maximum value Y2 among different locations of a same area size, where a value of Y1/Y2 is N, and N≥0.7.

In the negative electrode plate, a mass percentage of the silicon-based material in the active substance layer is 2%-80%.

In the negative electrode plate, the silicon-based material includes $SiO_x$, where $0.6 \leq x \leq 1.5$; and/or an average particle size of the silicon-based material is 500 nm-30 μm.

In the negative electrode plate, the silicon-based material includes at least one of Si, $SiO_x$, a silicon-carbon material or a silicon alloy, where a particle size of Si is less than 100 nm and $0.6 \leq x \leq 1.5$.

In the negative electrode plate, in an X-ray diffraction pattern of the silicon-based material, the highest intensity at 2θ within the range of 20.5°-21.5° is $I_1$, and the highest intensity at 2θ within the range of 28.0°-29.0° is $I_2$, where $0 < I_2/I_1 \leq 1$.

In the negative electrode plate, particle size distribution of the silicon-based material satisfies $0.3 \leq D_n 10/D_v 50 \leq 0.6$.

In the negative electrode plate, the active substance layer further includes a binder, the binder includes at least one of carboxymethyl cellulose, polyacrylic acid, polyvinyl pyrrolidone, polyaniline, polyimide, polyamide-imide, polysiloxane, polystyrene-butadiene rubber, epoxy resin, polyester resin, polyurethane resin, or polyfluorene, and a mass percentage of the binder in the active substance layer is 0.5%-10%.

In the negative electrode plate, the active substance layer further includes a conductive agent, the conductive agent includes at least one of single-wall carbon nanotubes, multi-wall carbon nanotubes, vapor grown carbon fiber, conductive carbon black, acetylene black, Ketjen black, conductive graphite, or graphene; and/or a mass percentage of the conductive agent in the active substance layer is 0.1%-5%.

This disclosure further provides an electrochemical apparatus including a positive electrode plate, a negative electrode plate, and a separator. The separator is disposed between the positive electrode plate and the negative electrode plate, and the negative electrode plate is the foregoing negative electrode plate.

This disclosure further provides an electronic apparatus including the foregoing electrochemical apparatus.

This disclosure further provides a method for preparing negative electrode slurry, including first-mixing a silicon-based material with a carbon material to obtain a mixture; second-mixing the mixture, a conductive agent, a binder, and a solvent to obtain a negative electrode slurry. The first-mixing includes dispersing at a speed of 10-100 r/min for 0.5-2 h. and the second-mixing includes dispersing at a speed of 300-2500 r/min for 0.5-3 h.

In this disclosure, the silicon-based material and the binder in the active substance layer are uniformly dispersed, improving C-rate performance and cycling performance of the electrochemical apparatus and reducing swelling of an electrode assembly.

DETAILED DESCRIPTION

The following embodiments may help persons skilled in the art to understand this disclosure more comprehensively, but impose no limitation on this disclosure in any manner.

Silicon has a high theoretical gram capacity (4200 mAh/g), much higher than the bottleneck capacity (372 mAh/g) of some carbon materials (for example, graphite), opening up a wider application prospect in electrochemical apparatuses (for example, lithium-ion batteries). However, after several charging/discharge cycles, a silicon-based material undergoes huge volume changes with intercalation and deintercalation of Li ions, and a volume swelling rate may reach 300%. In this case, tremendous mechanical stress (up to 1 GPa) is produced, which leads to pulverization of silicon particles and detachment of active material from a current collector, thereby degrading cycling performance of the electrochemical apparatuses (for example, lithium-ion batteries). In addition, low conductivity of silicon (electronic conductivity of powder<$10^{-7}$ S/cm) causes severe polarization, further degrading cycling performance of the electrochemical apparatuses.

At present, for a problem of rapid degradation of electrical performance due to large volume swelling and poor electrical conductivity of a silicon-based material during cycling, the following solution is mainly used. First, the silicon-based material is subjected to nanocrystallization. Absolute volume change of nano materials during cycling is much smaller than that of a common material, helping maintain a structural stability of the material; however, nano materials are prone to agglomeration and have a large specific surface area (>100 $m^2$/g), consuming more electrolyte to form an SEI film, which limits further application of the nano silicon-based material. Second, the silicon-based material is mixed with graphite or another material (a metallic or non-metallic material). With good conductivity (≈7 S/cm) and low swelling (<10%) of graphite and the another material, volume swelling of the silicon-based material during cycling can be greatly reduced and conductivity of a system can be improved. However, this method can only play a role at an early stage. As the cycling goes on, performance of the electrochemical apparatuses drops sharply due to failure in well restraining swelling of the silicon-based material. Third, a binder is used to optimize a negative electrode made of the silicon-based material. However, binders currently used are still unable to withstand huge stress (up to 1 GPa) produced by volume swelling and contraction of the silicon-based material, and the binders are prone to failure due to fatigue during cycling.

This disclosure improves dispersion uniformity of a silicon-based material in a negative electrode. In this way, uniformity of current distribution in an electrode plate can be improved, swelling and contraction in each zone is more even during charging/discharging of the electrochemical apparatus, and polarization is reduced, which helps improve cycling performance and C-rate performance of the electrochemical apparatus. In addition, as the silicon-based material is uniformly dispersed in the carbon material (for example, graphite), the carbon material can effectively relieve volume change of the silicon-based material during charging/discharging, thereby reducing swelling of the electrode assembly and improving safety of the electrochemical apparatus. In addition, dispersion uniformity of the silicon-based material in the negative electrode plate is improved by a stirring process, which reduces tedious processes of improving the silicon-based material, effectively reducing costs.

Figure 1:
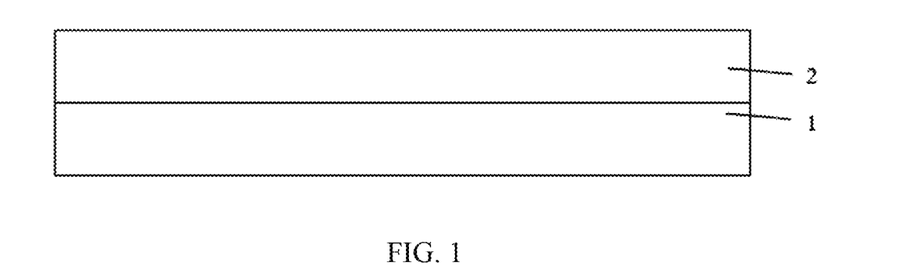
FIG. 1 is a schematic diagram of a negative electrode plate of this disclosure.

As shown in FIG. 1, some embodiments of this disclosure provide a negative electrode plate, where the negative electrode plate includes a current collector 1 and an active substance layer 2. The active substance layer 2 is provided on the current collector 1. It should be understood that the active substance layer 2 being provided on one side of the current collector 1 as in FIG. 1 is only an example. Alternatively, the active substance layer 2 may be provided on two sides of the current collector 1. In some embodiments, the current collector of the negative electrode plate may include one or more of a copper foil, an aluminum foil, a nickel foil, or a carbon-based current collector.

In some embodiments, the active substance layer includes a silicon-based material. In some embodiments, the silicon-based material may include $SiO_x$, where 0.6≤x≤1.5. In some embodiments, the silicon-based material includes at least one of Si, $SiO_x$, a silicon-carbon material or a silicon alloy.

In some embodiments, the active substance layer further includes a carbon material and a binder. In some embodiments, the carbon material may include graphite, graphene, and the like. In some embodiments, the binder may include at least one of carboxymethyl cellulose (CMC), polyacrylic acid, polyvinyl pyrrolidone, polyaniline, polyimide, polyamide-imide, polysiloxane, polystyrene-butadiene rubber, epoxy resin, polyester resin, polyurethane resin, or polyfluorene.

In some embodiments, to characterize dispersion uniformity of element silicon in the active substance layer, a minimum value and a maximum value of the proportion by mass of element silicon in the active substance layer among different locations of a same area size are defined as X1 and X2 respectively, where a value of X1/X2 is M, and M≥0.7. A larger M indicates a smaller distribution difference of the element silicon in the active substance layer. In other words, the element silicon is distributed in a more uniform manner, preventing ununiform stress imposed on a current collector caused by ununiform distribution of the element silicon as well as uneven current distribution on the current collector. When M is less than 0.7, there may be volume swelling and other problems due to ununiform distribution of a silicon-based material. In some embodiments, a weight loss rate of the active substance layer under thermogravimetric (TG) analysis within 800° C. has a minimum value Y1 and a maximum value Y2 among different locations of a same area size, where a value of Y1/Y2 is N, and N≥0.7. Actually, N is equivalent to a ratio of the minimum weight loss to the maximum weight loss. As thermogravimetric analysis can reflect distribution of a binder, a larger N means more uniform distribution of the binder in the active substance layer. Uniform distribution of the binder helps suppress volume swelling of the silicon-based material in a uniform manner, making the silicon-based material be uniformly bonded with a carbon material. Therefore, larger M and N indicate more uniform dispersion of the silicon-based material and the binder in the carbon material (for example, graphite) and more uniform overall material distribution in the active substance layer.

In some embodiments, a mass percentage of the silicon-based material in the active substance layer is 2%-80%. In some embodiments, the mass percentage of the silicon-based material in the active substance layer is 2%-40%. When the mass percentage of the silicon-based material in the active substance layer is less than 2%, the silicon-based material has a limited effect on improving C-rate performance of an electrochemical apparatus. When the mass percentage of the silicon-based material in the active substance layer is more than 40%, insufficient conductivity of the silicon-based material becomes somewhat prominent, which is not conducive to further improving C-rate performance of the electrochemical apparatus. When the mass percentage of the silicon-based material in the active substance layer is more than 80%, insufficient conductivity of the silicon-based material becomes even prominent, which, in turn, degrades C-rate performance of the electrochemical apparatus.

In some embodiments, an average particle size of the silicon-based material is 500 nm-30 µm. If the average particle size of the silicon-based material is excessively small, the silicon-based material is prone to agglomeration and has a large specific surface area, consuming more electrolyte to form an SEI film. If the average particle size of the silicon-based material is excessively large, it is not conducive to suppressing volume swelling of the silicon-based material, and it is easy to degrade conductivity of the active substance layer. In addition, if the average particle size of the silicon-based material is excessively large, strength of the negative electrode plate reduces. In some embodiments, a particle size of Si is less than 100 nm.

In some embodiments, in an X-ray diffraction pattern of the silicon-based material, the highest intensity at 2θ within the range of 20.5°-21.5° is $I_1$, and the highest intensity at 2θ within the range of 28.0°-29.0° is $I_2$, where $0 < I_2/I_1 \leq 1$. In some embodiments, a smaller $I_2/I_1$ is more conducive to improving C-rate performance and cycling performance of the electrochemical apparatus and reducing swelling of the electrode assembly.

In some embodiments, particle size distribution of the silicon-based material satisfies: $0.3 \leq D_n 10/D_v 50 \leq 0.6$, where $D_n 10$ is a particle diameter when a cumulative quantity-of-particles based distribution percentage reaches 10%, which is obtained with a laser scattering particle analyzer, and $D_v 50$ is a particle diameter when a cumulative volume based distribution percentage reaches 50%, which is obtained with a laser scattering particle analyzer. In some embodiments, a smaller $D_n 10/D_v 50$, for example, less than 0.3, means poorer dispersion uniformity (the M value decreases) of the silicon-based material, which degrades cycling performance of an electrochemical apparatus. An excessively large $D_n 10/D_v 50$, for example, greater than 0.6, reduces dispersion uniformity of the silicon-based material, degrading cycling performance and C-rate performance of the electrochemical apparatus and leading to swelling of the electrode assembly.

In some embodiments, a mass percentage of the binder in the active substance layer is 0.5%-10% e. A reduced percentage of the binder helps improve a dispersion effect of the binder, reduces a surface area of the active substance coated by the binder, and improves C-rate performance. However, an excessively low amount of the binder, for example, a mass percentage of less than 0.5%, degrades a dispersion effect of the silicon-based material, reduces a bonding effect thereof, degrades cycling performance of an electrochemical apparatus, and leads to swelling of an electrode assembly. In addition, an excessively large amount (for example, a mass percentage of more than 10%) of the binder makes the binder difficult to disperse, and reduces a dispersion effect of the silicon-based material. In addition, excessive binder degrades C-rate performance and cycling performance of the electrochemical apparatus, and leads to swelling of the electrode assembly.

In some embodiments, the active substance layer further includes a conductive agent, where the conductive agent includes at least one of single-wall carbon nanotubes, multi-wall carbon nanotubes, vapor grown carbon fiber, conductive carbon black, acetylene black. Ketjen black, conductive graphite, or graphene. In some embodiments, a mass percentage of the conductive agent in the active substance layer is 0.1%-5%. An excessively low amount of the conductive agent easily causes insufficient conductivity of the active substance layer, and an excessively high amount of the conductive agent degrades C-rate performance of an electrochemical apparatus.

In some embodiments, the negative electrode plate has a thickness of 50 µm-200 µm, a single side compacted density of 1.2 g/cm$^3$-2.0 g/cm$^3$, and resistivity of 0.001 Ω·cm-1000 Ω·cm. In some embodiments, a peeling strength between the active substance layer and the current collector of the negative electrode plate is greater than 10 N/m. An excessive low peeling strength between the active substance layer and the current collector makes the active substance layer easily fall off the current collector.

Figure 2:
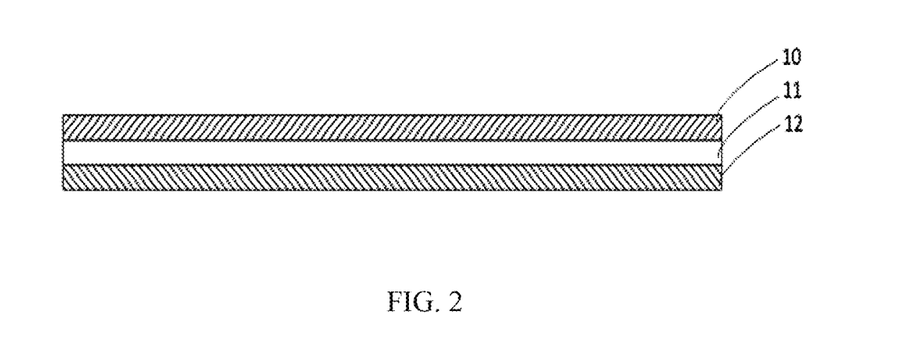
FIG. 2 is a schematic diagram of an electrode assembly of an electrochemical apparatus of this disclosure.

As shown in FIG. 2, some embodiments of this disclosure provide an electrochemical apparatus, and an electrode assembly of the electrochemical apparatus includes a positive electrode plate 10, a negative electrode plate 12, and a separator 11 disposed between the positive electrode plate 10 and the negative electrode plate 12. The positive electrode plate 10 may include a positive electrode current collector and a positive electrode active substance layer applied on the positive electrode current collector. In some embodiments, the positive electrode plate 10 is provided with a positive electrode active substance layer, and the positive electrode active substance layer may be applied on only part of the positive electrode current collector. The positive electrode active substance layer may include a positive active substance, a conductive agent, and a binder. The positive electrode current collector may use an Al foil, or may use another positive electrode current collector commonly used in the art. The conductive agent of the positive electrode plate may include one or more of conductive carbon black, flake graphite, graphene, and carbon nanotubes. The binder in the positive electrode plate may include one or more of polyvinylidene fluoride, vinylidene fluoride-hexafluoropropylene copolymer, styrene-acrylate copolymer, styrene-butadiene copolymer, polyamide, polyacrylonitrile, polyacrylate, polyacrylic acid, polyacrylate, sodium carboxymethylcellulose, polyvinyl acetate, polyvinylpyrrolidone, polyvinyl ether, polymethyl methacrylate, polytetrafluoroethylene, and polyhexafluoropropylene. The positive electrode active substance includes, but is not limited to one or more of lithium cobaltate, lithium nickelate, lithium manganate, cobalt lithium nickelate, lithium iron phosphate, lithium nickel cobalt aluminate, and lithium nickel cobalt manganate. The foregoing positive electrode active substances may include doped or coated positive electrode active substances.

In some embodiments, the separator 11 includes one or more of polyethylene, polypropylene, polyvinylidene fluoride, polyethylene terephthalate, polymide, and aramid. For example, polyethylene includes one or more selected from high-density polyethylene, low-density polyethylene, and ultra-high molecular weight polyethylene. Especially, polyethylene and polypropylene have a good effect on preventing short circuits, and can improve stability of a battery through a shutdown effect.

In some embodiments, a surface of the separator may further include a porous layer. The porous layer is provided on at least one surface of the separator and includes inorganic particles and a binder, where the inorganic particles are selected from one or more of aluminum oxide ($Al_2O_3$), silicon dioxide ($SiO_2$), magnesium oxide (MgO), titanium oxide ($TiO_2$), hafnium dioxide ($HfO_2$), stannic oxide ($SnO_2$), cerium dioxide ($CeO_2$), nickel oxide (NiO), zinc oxide (ZnO), calcium oxide (CaO), zirconium dioxide ($ZrO_2$), yttrium oxide ($Y_2O_3$), silicon carbide (SiC), boehmite, aluminum hydroxide, magnesium hydroxide, calcium hydroxide, and barium sulfate. The binder is selected from one or more of polyvinylidene fluoride, vinylidene fluoride-hexafluoropropylene copolymer, polyamide, polyacrylonitrile, polyacrylic ester, polyacrylic acid, polyacrylate, cellulose sodium carboxymethyl, polyvinylpyrrolidone, polyvinyl ether, polymethyl methacrylate, polytetrafluoroethylene, and polyhexafluoropropylene. The porous layer on the surface of the separator can improve heat resistance, oxidation resistance, and electrolyte infiltration performance of the separator, and enhances adhesion between the separator and the electrode plate.

In some embodiments, the negative electrode plate 12 may be the foregoing negative electrode plate.

In some embodiments, a method for preparing negative electrode slurry is further provided, including: performing a first mixing of a silicon-based material with a carbon material to obtain a mixture; and then performing a second mixing of the mixture, a conductive agent, a binder, and a solvent to obtain the negative electrode slurry. In some embodiments, the silicon-based material, carbon material, binder, and conductive agent are selected from the foregoing materials. The solvent may be deionized water, or the like. A mass ratio of the mixture, conductive agent and binder may be 95:1.2:3.8, or the like. It should be understood that this is only illustrative and not intended to limit this disclosure.

In some embodiments, the first mixing includes dispersing at a rotation speed of 10-100 r/min for 0.5-2 h. If a mixing time of the silicon-based material and the carbon material is too short, the silicon-based material cannot be dispersed effectively, resulting in an increase in the M value, degradation of C-rate performance and cycling performance of the electrochemical apparatus, and swelling of an electrode assembly; and if a mixing time is too long, it has little effect on increasing the M value and is not conducive to improving preparation efficiency. In some embodiments, the second mixing includes dispersing at a rotation speed of 300-2500 r/min for 0.5-3 h. An increased dispersion time for the second mixing helps improve the dispersion uniformity of the binder (the N value increases), and also the dispersion uniformity of the silicon-based material (the M value increases), which is conducive to improving C-rate performance and cycling performance of the electrochemical apparatus and reducing cyclic swelling of the electrode assembly. In addition, a too long mixing time has little effect on the M value and N value, and is not conducive to improving preparation efficiency.

In some embodiments of this disclosure, the electrode assembly of the electrochemical apparatus is a wound electrode assembly or a stacked electrode assembly.

In some embodiments, the electrochemical apparatus includes a lithium-ion battery. However, this disclosure is not limited thereto. For example, the electrochemical apparatus may further include an electrolyte. In some embodiments, the electrolyte includes at least two of dimethyl carbonate (DMC), ethyl methyl carbonate (EMC), diethyl carbonate (DEC), ethylene carbonate (EC), propylene carbonate (PC), and propyl propionate (PP). In addition, the electrolyte may further additionally include at least one of vinylene carbonate (VC), fluoroethylene carbonate (FEC), and a dinitrile compound that serve as electrolyte additives.

In some embodiments of this disclosure, using a lithium-ion battery as an example, a positive electrode plate, a separator, and a negative electrode plate are wound or stacked in sequence to form an electrode assembly, and the electrode assembly is then packaged, for example, in an aluminum-plastic film, followed by injection of an electrolyte, formation, and packaging, so that the lithium-ion battery is prepared. Then, a performance test and a cycle test are performed on the prepared lithium-ion battery.

Persons skilled in the art will understand that the electrochemical apparatus (for example, the lithium-ion battery) and the method for preparing the negative electrode slurry are only embodiments. Without departing from the content disclosed in this disclosure, other methods commonly used in the art may be used.

An embodiment of this disclosure further provides an electronic apparatus including the foregoing electrode assembly or an electronic apparatus including the foregoing electrochemical apparatus. In some embodiments, the electronic apparatus may include a mobile phone, a tablet, or any electronic apparatus using a rechargeable battery for charging.

Some specific examples and comparative examples are listed below to better illustrate this disclosure.

In the following Examples 1 to 19 and Comparative Examples 1 to 10 of this disclosure, lithium-ion batteries are used as examples. Raw materials, proportions of raw materials, preparation methods, and the like used in preparation of the lithium-ion batteries are just examples. This disclosure is not limited to the raw materials, proportions of raw materials, and preparation methods used in the following examples.

Preparation of positive electrode plate: A positive electrode active substance $LiCoO_2$, conductive carbon black, and a binder polyvinylidene fluoride (PVDF) were fully stirred and uniformly mixed in an N-methylpyrrolidone solvent system at a mass ratio of 96.7:1.7:1.6, and then a resulting mixture was applied onto an Al foil, followed by drying and cold pressing to obtain a positive electrode plate. Positive electrode plates prepared in Examples 1 to 19 and Comparative Examples 1 to 10 were the same.

Preparation of negative electrode plate: 900 g of graphite and 100 g of SiO were firstly mixed and dispersed at 80 r/min for 1.5 h to obtain a powder mixture, then the powder mixture, a conductive agent conductive carbon black, and polyacrylic acid (PAA) were secondly mixed in a deionized water solvent system at a mass ratio of 95:1.2:3.8, and dispersed at 1500 r/min for 2 h to obtain a negative electrode slurry. The negative electrode slurry was applied onto a copper foil to form a negative electrode active substance layer, followed by drying and cold pressing the coated copper foil, to obtain a negative electrode plate. Examples 1 to 19 and Comparative Examples 1 to 10 are similar except for materials used, amounts of the materials added, and mixing time of the materials added for preparation of negative electrode plates, with details shown in Table 1.

Preparation of battery: With a polyethylene porous polymeric film as a separator, the positive electrode plate, the separator, and the negative electrode plate were stacked in sequence, so that the separator was placed between the positive electrode plate and the negative electrode plate for isolation, and the stack was wound to obtain an electrode assembly. The electrode assembly was placed in an outer packaging aluminum-plastic film, injected with an electrolyte including ethylene carbonate (EC) and propylene carbonate (PC), and packaged, followed by processes such as formation, degassing, and trimming to obtain a lithium-ion battery. In Examples 1 to 19 and Comparative Examples 1 to 10, respective lithium-ion batteries were obtained by using same steps of battery preparation.

Parameter settings of Examples 1 to 19 and Comparative Examples 1 to 10 are shown in Table 1 below.

TABLE 1

| Example | Silicon-based material/ amount added (g) | $I_2/I_1$ value | $D_v50$ (μm) | $D_n10/D_v50$ | Amount of carbon material graphite added (g) | Binder/amount added (g) | Amount of conductive agent conductive carbon black added (g) | First mixing time (h) | Second mixing time (h) |
|---|---|---|---|---|---|---|---|---|---|
| 1 | SiO/100 g | 0.62 | 5.3 | 0.5 | 900 g | PAA/25 g | 10 g | 1.5 h | 2 h |
| 2 | SiO/100 g | 0.62 | 5.3 | 0.5 | 150 g | PAA25 g | 10 g | 1.5 h | 2 h |
| 3 | SiO/100 g | 0.62 | 5.3 | 0.5 | 400 g | PAA25 g | 10 g | 1.5 h | 2 h |
| 4 | SiO/100 g | 0.62 | 5.3 | 0.5 | 1900 g | PAA25 g | 10 g | 1.5 h | 2 h |
| 5 | SiO/100 g | 0.62 | 5.3 | 0.5 | 900 g | CMC/25 g | 10 g | 1.5 h | 2 h |
| 6 | SiO/100 g | 0.62 | 5.3 | 0.5 | 900 g | CMC/12.5 g + PAA/12.5 g | 10 g | 1.5 h | 2 h |
| 7 | SiO/100 g | 0.62 | 5.3 | 0.5 | 900 g | PAA/10 g | 10 g | 1.5 h | 2 h |
| 8 | SiO/100 g | 0.62 | 5.3 | 0.5 | 900 g | PAA/50 g | 10 g | 1.5 h | 2 h |
| 9 | SiO/100 g | 0.62 | 5.3 | 0.5 | 900 g | PAA/100 g | 10 g | 1.5 h | 2 h |
| 10 | SiO/100 g | 0.62 | 5.3 | 0.5 | 900 g | PAA/25 g | 10 g | 0.5 h | 2 h |
| 11 | SiO/100 g | 0.62 | 5.3 | 0.5 | 900 g | PAA/25 g | 10 g | 2 h | 2 h |
| 12 | SiO/100 g | 0.62 | 5.3 | 0.5 | 900 g | PAA/25 g | 10 g | 1.5 h | 0.5 h |
| 13 | SiO/100 g | 0.62 | 5.3 | 0.5 | 900 g | PAA/25 g | 10 g | 1.5 h | 3 h |
| 14 | Silicon carbon/100 g | — | 8.5 | — | 900 g | PAA/25 g | 10 g | 1.5 h | 2 h |
| 15 | Ferrosilicon alloy/100 g | — | 6.9 | — | 900 g | PAA/25 g | 10 g | 1.5 h | 2 h |
| 16 | SiO/100 g | 0.42 | 5.2 | 0.5 | 900 g | PAA/25 g | 10 g | 1.5 h | 2 h |
| 17 | SiO/100 g | 1 | 5.4 | 0.5 | 900 g | PAA/25 g | 10 g | 1.5 h | 2 h |
| 18 | SiO/100 g | 0.62 | 5.4 | 0.3 | 900 g | PAA/25 g | 10 g | 1.5 h | 2 h |
| 19 | SiO/100 g | 0.62 | 5.3 | 0.6 | 900 g | PAA/25 g | 10 g | 1.5 h | 2 h |
| Comparative example | | | | | | | | | |
| 1 | SiO/100 g | 0.62 | 5.3 | 0.5 | 900 g | PAA/5 g | 10 g | 1.5 h | 2 h |
| 2 | SiO/100 g | 0.62 | 5.3 | 0.5 | 900 g | PAA/25 g | 10 g | 0.2 h | 2 h |
| 3 | SiO/100 g | 0.62 | 5.3 | 0.5 | 900 g | PAA/25 g | 10 g | 1.5 h | 0.2 h |
| 4 | SiO/100 g | 2.4 | 5.3 | 0.5 | 900 g | PAA/25 g | 10 g | 1.5 h | 2 h |
| 5 | SiO/100 g | 0.62 | 5.4 | 0.05 | 900 g | PAA/25 g | 10 g | 1.5 h | 2 h |
| 6 | SiO/100 g | 0.62 | 5.5 | 0.8 | 900 g | PAA/25 g | 10 g | 1.5 h | 2 h |
| 7 | Silicon carbon/100 g | — | 8.5 | — | 900 g | PAA/25 g | 10 g | 0.2 h | 2 h |
| 8 | Silicon carbon/100 g | — | 8.5 | — | 900 g | PAA/25 g | 10 g | 1.5 h | 0.2 h |
| 9 | Ferrosilicon alloy/100 g | — | 6.9 | — | 900 g | PAA/25 g | 10 g | 0.2 h | 2 h |
| 10 | Ferrosilicon alloy/100 g | — | 6.9 | — | 900 g | PAA/25 g | 10 g | 1.5 h | 0.2 h |

Test of Silicon Content in Negative Electrode Plate:

A muffle furnace was preheated to 400° C. 0.05-1 g of sample was weighed and placed in a crucible, and 1.2-1.5 g of dry KOH reagent was weighed and placed in the crucible, then the crucible was covered with a lid and placed on a crucible holder. After temperature of the muffle furnace rose to 400° C., the crucible holder was placed into the muffle furnace and heated for about 45 minutes (subject to whether liquid KOH completely covered the sample). After sample melting was completed, the crucible holder was taken out and cooled down. In addition, a clean beaker was used to take an appropriate amount of pure water and placed on an electric stove to pre-boil the water. The crucible and crucible lid that had been cooled down were put into a clean 200 ml plastic beaker with a pair of nickel tweezers. About 50 ml of boiling water was added into the beaker so that the crucible lid and crucible are completely soaked in the boiling water for about 60 minutes. The crucible and crucible lid were taken out with a pair of nickel tweezers. Inner and outer walls of the crucible and front and back of the crucible lid were cleaned for 2 to 3 times with pure water by using a bottle with small water output. The sample solution was filtered with a piece of medium speed filter paper into a 100 ml polypropylene (PP) volumetric bottle and diluted to a definite volume. The solution diluted to the definite volume was mixed, and then 1 ml sample solution was transferred to a 100 ml PP volumetric flask with a pipette or plastic pipette and diluted to 100 ml. Then a test was performed.

Thermogravimetric (TG) Analysis of Negative Electrode Plate:

Five or more points on the electrode plate were taken at random and punched into small discs having a same area. The small discs were placed in a STA449F3-QMS403C instrument for heating, where a temperature rose to 800° C., a heating rate was 10° i/min, and protective atmosphere was $N_2$ with a purity of 99.99%. A rate of purge gas was 60 mL/min, and a protective gas flow rate was 20 mL/min. In the beating process, a curve showing a gradual decrease in weight with temperature rise, in other words, a thermogravimetric curve, was obtained. When the temperature rose to 800° C., a proportion of weight reduced was a proportion of weight loss of an electrode plate.

Sheet Resistance Test of Negative Electrode Plate:

Electrode plate resistivity was tested using a four-probe method. An instrument used in a four-probe method test was a precision direct current voltage and current source (type SB118). Four copper plates of 1.5 cm length×1 cm width×2 mm thickness were fixed onto a line at an equal distance. A distance between two copper plates in the middle was L (1 to 2 cm). A substrate for fixing the copper plates is an insulating material. During the test, lower end surfaces of four copper plates were pressed on an electrode plate to be tested. Copper plates on two ends were connected with direct current I. A voltage V was measured between the two copper plates in the middle. Three I and three V values were read and an average of I and V was taken. V/I was the average sheet resistance at a test site.

Compacted Density Test of Electrode Plate:

An electrode plate was compacted at a pressure of 30 T, punched into discs having an area of 1540.25 mm². Thickness of the disc was measured with a micrometer. The disc was weighted and a volume of the disc was calculated so that a compacted density of the electrode plate can be calculated.

Peeling Strength Test of Electrode Plate:

Adhesion of a negative electrode plate containing silicon was tested by using a tensile tester. The electrode plate was cut into pieces with a size of 15 mm×2 mm. The cut electrode plates were pasted to a stainless steel plate with 3M double-sided tape and placed on the tensile tester to test adhesion of the electrode plate.

X-Ray Diffraction (XRD) Test:

1.0-2.0 g of sample was weighed, poured into a groove of a glass sample holder, compacted and smoothed with a glass sheet, and tested by using an X-ray diffractometer (Bruker, D8) according to JJS K 0131-1996 General Rules for X-ray Diffraction Analysis. A test voltage was set to 40 kV a current to 30 mA, a scanning angle range to 10-85°, a scanning step to 0.0167°, and a duration for each step to 0.24 s, to obtain an XRD diffraction pattern from which the highest intensity $I_2$ at 2θ within the range of 28.4° and the highest intensity L at 2θ within the range of 21.0° were obtained. Then a value of $I_2/I_1$ was calculated.

Particle Size Test:

0.02 g of a powder sample was added into a 50 ml clean beaker, 20 ml of deionized water was added into the beaker, a few drops of a 1% surfactant were added to make the powder fully dispersed in the water, the powder was subjected to ultrasound for 5 minutes in a 120 W ultrasonic cleaning machine, and a particle size distribution was tested with a MasterSizer 2000.

Cycling Performance Test of Battery:

At a test temperature of 45° C., a battery was charged to 4.4 V at a constant current of 0.7 C, constant-voltage charged to 0.025 C, left standing for 5 minutes, and then discharged to 3.0 V at 0.5 C. A capacity obtained in this step was an initial capacity. Then, a 0.7 C charge/0.5 C discharge cycle test was performed. A ratio of a capacity of each cycle to the initial capacity was calculated to obtain a capacity attenuation curve, and the number of cycles when the capacity drops to 80% of the initial capacity was recorded.

Swelling Rate Test of Electrode Assembly at Full Charge:

A thickness of a new electrode assembly at half charge was tested with a screw micrometer. The electrode assembly was in a fully charged state after 400 cycles, a thickness of the electrode assembly was tested again with the spiral micrometer, which is then compared with the thickness of the new electrode assembly at half charge so that a swelling rate of the electrode assembly at full charge can be obtained.

Discharge Rate Performance Test:

At 25° C., an electrode assembly was discharged to 3.0 V at 0.2 C, left standing for 5 minutes, charged to 4.4 V at 0.5 C, constant-voltage charged to 0.05 C, and left standing for 5 minutes. The discharge rate was adjusted and discharge tests were performed separately at 0.2 C, 0.5 C, 1 C, 1.5 C, and 2.0 C, to obtain discharge capacities. Capacities obtained at these rates were compared with a capacity obtained at 0.2 C, to obtain ratios.

Direct Current Resistance (DCR) Test:

At 25° C., an actual capacity of an electrode assembly was tested with a Maccor machine (constant-current charged to 4.4 V at 0.7 C, constant-voltage charged to 0.025 C, left standing for 10 minutes, discharged to 3.0 V at 0.1 C, and left standing for 5 minutes). The electrode assembly was discharged to a given state of charge (SOC) at 0.1 C. A discharge test was performed for 1 second, and sampling was performed every 5 ms, and DCR values at different SOCs were calculated.

Data statistics are made on results of Examples 1 to 19 and Comparative Examples 1 to 10, with statistical results shown in Table 2.

TABLE 2

| Example | X1 (%) | X2 (%) | M | Y1 (%) | Y2 (%) | N | Plate thickness (μm) | Single side compacted density (g/cm³) | Peeling strength of electrode plate (N/m) | Average sheet resistance (mΩ) | Cycles when capacity decays to 80% at 45° C. | Swelling rate of electrode assembly at full change after 400 cycles | C-rate performance (Discharge capacity at 2 C/discharge capacity at 0.2 C) | DCR (under room temperature and 10% SOC, mΩ) |
|---|---|---|---|---|---|---|---|---|---|---|---|---|---|---|
| 1 | 5.12 | 5.56 | 0.92 | 1.95 | 2.32 | 0.84 | 91 | 1.75 | 32 | 24.5 | 420 | 6.8% | 88.9% | 62 |
| 2 | 19.5 | 23.8 | 0.82 | 6.51 | 7.62 | 0.85 | 55 | 1.65 | 54 | 550.4 | 205 | 16.2% | 86.7% | 86 |
| 3 | 8.67 | 10.00 | 0.87 | 3.45 | 4.10 | 0.84 | 75 | 1.70 | 44 | 235.1 | 314 | 11.5% | 92.6% | 75 |
| 4 | 2.12 | 2.23 | 0.95 | 0.87 | 1.02 | 0.85 | 111 | 1.78 | 26 | 11.4 | 734 | 4.6% | 86.9% | 53 |
| 5 | 5.21 | 5.62 | 0.93 | 1.65 | 1.91 | 0.86 | 91 | 1.75 | 29 | 21.5 | 415 | 7.0% | 89.2% | 63 |
| 6 | 5.18 | 5.59 | 0.93 | 1.78 | 2.05 | 0.87 | 91 | 1.75 | 31 | 23.2 | 432 | 6.6% | 89.3% | 62 |
| 7 | 5.24 | 5.86 | 0.89 | 0.78 | 0.89 | 0.88 | 90 | 1.75 | 21 | 23.5 | 384 | 7.2% | 90.2% | 63 |
| 8 | 5.11 | 5.45 | 0.94 | 3.78 | 4.49 | 0.84 | 93 | 1.75 | 42 | 27.4 | 445 | 6.5% | 87.2% | 67 |
| 9 | 4.96 | 5.69 | 0.87 | 7.56 | 9.58 | 0.79 | 97 | 1.75 | 65 | 29.8 | 321 | 5.9% | 80.2% | 77 |
| 10 | 4.98 | 5.89 | 0.85 | 2.04 | 2.36 | 0.86 | 91 | 1.75 | 32 | 25.4 | 376 | 7.6% | 85.6% | 67 |
| 11 | 5.06 | 5.45 | 0.93 | 2.02 | 2.35 | 0.86 | 91 | 1.75 | 31 | 23.6 | 425 | 6.7% | 89.0% | 61 |
| 12 | 4.97 | 5.51 | 0.90 | 1.89 | 2.42 | 0.78 | 91 | 1.75 | 27 | 25.3 | 325 | 7.6% | 86.1% | 68 |
| 13 | 5.10 | 5.51 | 0.93 | 1.98 | 2.21 | 0.90 | 91 | 1.75 | 35 | 22.7 | 433 | 6.6% | 89.3% | 61 |
| 14 | 1.46 | 1.60 | 0.91 | 1.95 | 2.32 | 0.84 | 127 | 1 75 | 32 | 24.5 | 330 | 12.1% | 88.9% | 62 |
| 15 | 3.98 | 4.35 | 0.91 | 1.96 | 2.36 | 0.83 | 119 | 1.75 | 30 | 22.3 | 342 | 11.8% | 89.2% | 64 |
| 16 | 5.12 | 5.57 | 0.92 | 1.97 | 2.33 | 0.85 | 91 | 1.75 | 32 | 24.8 | 450 | 6.3% | 89.9% | 58 |
| 17 | 5.14 | 5.54 | 0.93 | 2.00 | 2.35 | 0.85 | 91 | 1.75 | 33 | 24.8 | 395 | 7.2% | 86.8% | 64 |
| 18 | 5.09 | 5.65 | 0.90 | 2.03 | 2.37 | 0.86 | 91 | 1.75 | 33 | 23.5 | 402 | 6.9% | 90.3% | 57 |
| 19 | 5.11 | 5.62 | 0.91 | 2.02 | 2.38 | 0.85 | 91 | 1.75 | 32 | 24.2 | 455 | 6.8% | 88.0% | 64 |

TABLE 2-continued

| Example | X1 (%) | X2 (%) | M | Y1 (%) | Y2 (%) | N | Plate thickness (μm) | Single side compacted density (g/cm³) | Peeling strength of electrode plate (N/m) | Average sheet resistance (mΩ) | Cycles when capacity decays to 80% at 45° C. | Swelling rate of electrode assembly at full change after 400 cycles | C-rate performance (Discharge capacity at 2 C/discharge capacity at 0.2 C) | DCR (under room temperature and 10% SOC, mΩ) |
|---|---|---|---|---|---|---|---|---|---|---|---|---|---|---|
| Comparative Example | | | | | | | | | | | | | | |
| 1 | 5.15 | 5.95 | 0.87 | 0.34 | 0.39 | 0.87 | 91 | 1.75 | 16 | 22.5 | 359 | 7.5% | 88.5% | 68 |
| 2 | 4.66 | 6.73 | 0.69 | 2.03 | 2.38 | 0.85 | 91 | 1 75 | 29 | 25.3 | 321 | 8.9% | 82.1% | 72 |
| 3 | 4.90 | 5.50 | 0.89 | 1.75 | 2.66 | 0.66 | 91 | 1.75 | 19 | 26.2 | 287 | 8.2% | 85.1% | 74 |
| 4 | 5.08 | 5.50 | 0.92 | 2.02 | 2.35 | 0.86 | 91 | 1.75 | 34 | 24.9 | 351 | 8.0% | 83.7% | 70 |
| 5 | 4.88 | 5.46 | 0.89 | 1.98 | 2.30 | 0.86 | 91 | 1.75 | 33 | 23.3 | 376 | 7.3% | 92.0% | 56 |
| 6 | 4.92 | 5.59 | 0.88 | 2.01 | 2.38 | 0.84 | 91 | 1.75 | 33 | 25.6 | 386 | 7.5% | 86.5% | 71 |
| 7 | 1.21 | 1.80 | 0.67 | 1.93 | 2.34 | 0.82 | 127 | 1.75 | 32 | 25.5 | 247 | 14.2% | 82.7% | 73 |
| 8 | 1.42 | 1.65 | 0.86 | 1.45 | 2.40 | 0.60 | 127 | 1.75 | 18 | 25.9 | 257 | 14.5% | 81.9% | 76 |
| 9 | 3.37 | 4.96 | 0.68 | 1.86 | 2.26 | 0.82 | 119 | 1.75 | 34 | 24.5 | 274 | 13.6% | 83.1% | 71 |
| 10 | 3.87 | 4.45 | 0.87 | 1.51 | 2.46 | 0.61 | 119 | 1.75 | 17 | 25.3 | 267 | 13.8% | 84.2% | 73 |

Figure 3:
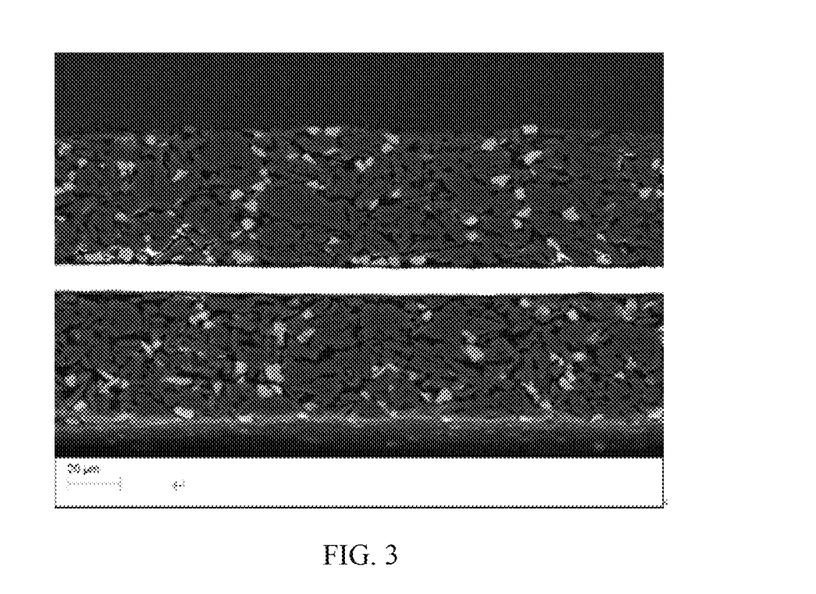
FIG. 3 is an image of a negative electrode plate of a lithium-ion battery in Example 1 of this disclosure.
Figure 4:
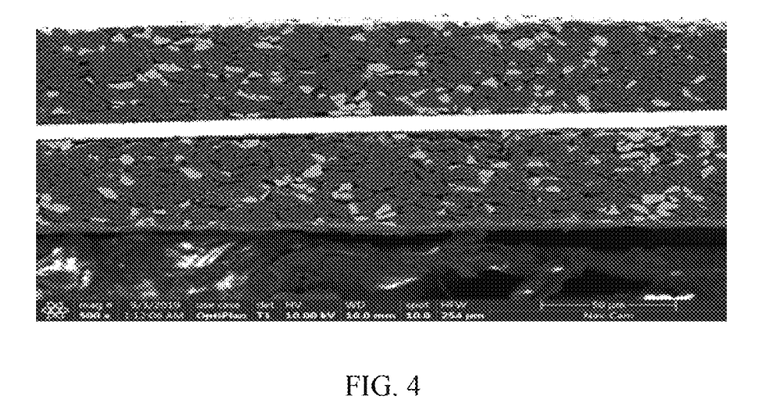
FIG. 4 is an image of a negative electrode plate of a lithium-ion battery in Example 2 of this disclosure.
Figure 5:
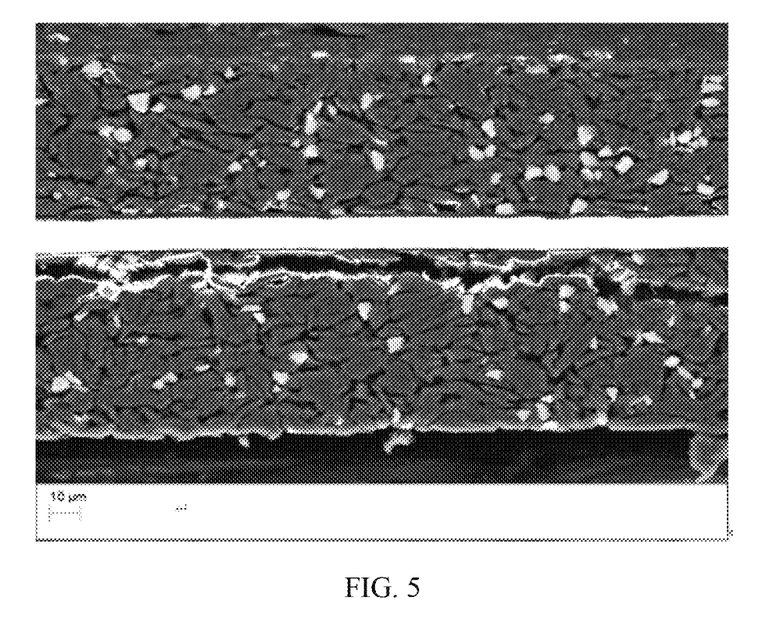
FIG. 5 is an image of a negative electrode plate of a lithium-ion battery in Example 4 of this disclosure.

By comparing Examples 1 to 4, it can be seen that, reduced percentages of silicon-based materials help improve dispersion uniformity of silicon-based materials in carbon materials and increase M values. Increased percentages of silicon-based materials help improve C-rate performance of electrochemical apparatuses. In addition, on the contrary, due to insufficient conductivity, an excessively high amount of silicon-based materials may cause degradation of C-rate performance and cycling performance of the electrochemical apparatuses, and lead to swelling of electrode assemblies. FIG. 3 shows an image of a negative electrode plate of a lithium-ion battery in Example 1 of this disclosure. FIG. 4 shows an image of a negative electrode plate of a lithium-ion battery in Example 2 of this disclosure. FIG. 5 shows an image of a negative electrode plate of a lithium-ion battery in Example 4 of this disclosure.

By comparing Examples 1, 5 and 6, it can be seen that, use of same amounts of carboxymethyl cellulose (CMC) and polyacrylic acid (PAA) as binders has same effects and can play a role of dispersing silicon-based material particles and bonding silicon-based material particles.

Figure 6:
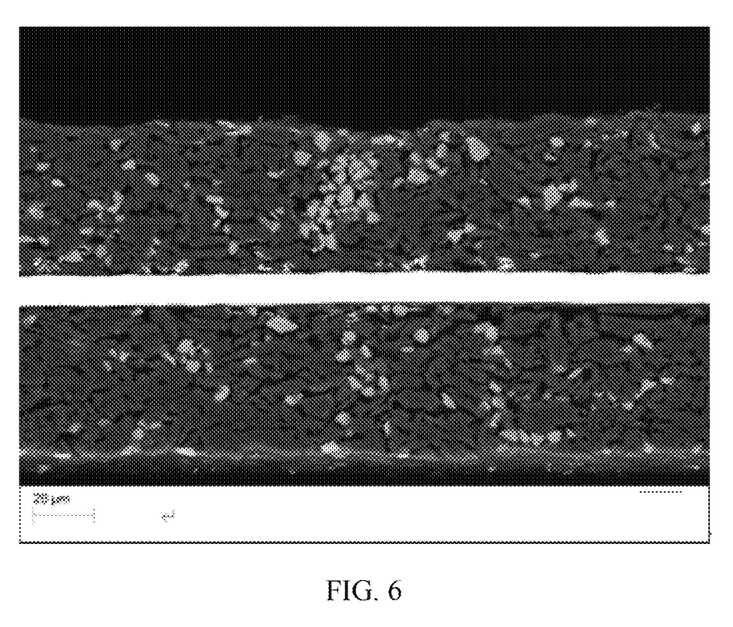
FIG. 6 is an image of a negative electrode plate of a lithium-ion battery in Comparative Example 1 of this disclosure.

By comparing Examples 1, 7, 8 and 9 and Comparative Example 1, it can be seen that, reduced amounts of binders help improve dispersion effects of the binders and C-rate performance of electrochemical apparatuses. However, this degrades dispersion effects of silicon-based materials, bonding effects, and cycling performance of the electrochemical apparatuses, and leads to swelling of electrode assemblies. In addition, too much binder is not easy to disperse, reducing dispersion effects of the silicon-based materials. To sum up, too much binder degrades C-rate performance and cycling performance of the electrochemical apparatus, and exacerbate swelling of the electrode assembly. Therefore, an amount of a binder added shall be controlled properly. For example, a mass percentage of a binder in an active substance layer should be controlled within 0.5%-10%, to effectively disperse a silicon-based material and the binder. FIG. 6 shows an image of a negative electrode plate of a lithium-ion battery in Comparative Example 1 of this disclosure.

By comparing Examples 1, 14, and 15 and Comparative Examples 7 to 10, it can be seen that, for different silicon-based materials, when M≥0.7 and N≥0.7, in other words, silicon-based materials and binders disperse uniformly, better C-rate performance, cycling performance, and lower swelling of electrode assemblies can be obtained.

By comparing Examples 1, 16, and 17 and Comparative Example 4, it can be seen that, increased $I_2/I_1$ of silicon-based materials has little effect on dispersion uniformity of silicon-based materials, but can significantly improve C-rate performance and cycling performance of electrochemical apparatuses, and reduce swelling of electrode assemblies.

By comparing Examples 1, 18, and 19 and Comparative Examples 5 and 6, it can be seen that, a smaller $D_n10/D_v50$ indicates poorer dispersion uniformity (decreased M values) of silicon-based materials and degraded cycling performance of electrochemical apparatuses. However, small particles of silicon-based materials help improve C-rate performance of the electrochemical apparatuses. In addition, an excessively large $D_n10/D_v50$ reduces dispersion uniformity of the silicon-based materials, degrades cycling performance and C-rate performance of the electrochemical apparatuses, and leads to swelling of electrode assemblies.

By comparing Examples 1, 10, and 11 and Comparative Example 2, it can be seen that, a too short mixing time of silicon-based materials and a carbon material graphite makes the silicon-based materials unable to disperse effectively, resulting in decreased M values and degraded C-rate performance and cycling performance of electrochemical apparatuses, and leading to swelling of electrode assemblies; and when a mixing time of silicon-based materials and a carbon material graphite reaches 0.5 h or more, silicon-based materials can be dispersed uniformly. However, a too long mixing time (for example, more than 2 h) has little effect on increasing M values.

By comparing Examples 1, 12, and 13 and Comparative Example 3, it can be seen that, increased dispersion time of binders (time for the second mixing) helps improve dispersion uniformity of the binders (N values increase) and dispersion uniformity of silicon-based materials (M values increase), which is conducive to improving C-rate performance and cycling performance of electrochemical apparatus and reducing cyclic swelling of electrode assemblies.

Therefore, dispersion uniformity of silicon-based materials and binders can significantly improve C-rate performance and cycling performance of electrochemical apparatuses, and reduce swelling of electrode assemblies.

The foregoing descriptions are only preferred embodiments of this disclosure and explanations of the applied technical principles. Persons skilled in the art should understand that the scope of disclosure involved in this disclosure is not limited to the technical solutions formed by the specific combination of the above technical features, and should also cover other technical solutions formed by any combination of the above technical features or their equivalent features without departing from the above disclosed concept. For example, a technical solution formed by replacement between the foregoing characteristics and technical characteristics having similar functions disclosed in this disclosure.

What is claimed is:

1. A negative electrode plate, comprising:
    a current collector; and
    an active substance layer provided on the current collector,
    wherein the active substance layer comprises a silicon-based material, and a proportion by mass of element silicon in the active substance layer has a minimum value X1 and a maximum value X2 among different locations of a same area size, wherein a value of X1/X2 is M, and M≥0.7; and
    a weight loss rate of the active substance layer under thermogravimetric (TG) analysis within 800° C. has a minimum value Y1 and a maximum value Y2 among different locations of a same area size, wherein N=Y1/Y2, and N≥0.7;
    wherein in an X-ray diffraction pattern of the silicon-based material, the highest intensity at 2θ within the range of 20.5°-21.5° is $I_1$, and the highest intensity at 2θ within the range of 28.0°-29.0° is $I_2$, wherein $0<I_2/I_1 \leq 1$.

2. The negative electrode plate according to claim 1, wherein a mass percentage of the silicon-based material in the active substance layer is 2%-80%.

3. The negative electrode plate according to claim 1, wherein the silicon-based material comprises $SiO_x$, wherein 0.6≤x≤1.5; and/or an average particle size of the silicon-based material is 500 nm-30 μm.

4. The negative electrode plate according to claim 1, wherein the silicon-based material comprises at least one of Si, $SiO_x$, a silicon-carbon material or a silicon alloy, wherein a particle size of Si is less than 100 nm, and 0.6≤x≤1.5.

5. The negative electrode plate according to claim 1, wherein particle size distribution of the silicon-based material satisfies $0.3 \leq D_n10/D_v50 \leq 0.6$, wherein $D_n10$ is a particle diameter when a cumulative quantity-of-particles based distribution percentage reaches 10%, which is obtained with a laser scattering particle analyzer, and $D_v50$ is a particle diameter when a cumulative volume based distribution percentage reaches 50%, which is obtained with a laser scattering particle analyzer.

6. The negative electrode plate according to claim 1, wherein the active substance layer further comprises a binder; the binder comprises at least one of carboxymethyl cellulose, polyacrylic acid, polyvinyl pyrrolidone, polyaniline, polyimide, polyamide-imide, polysiloxane, polystyrene-butadiene rubber, epoxy resin, polyester resin, polyurethane resin, or polyfluorene; and a mass percentage of the binder in the active substance layer is 0.5%-10%.

7. The negative electrode plate according to claim 1, wherein the active substance layer further comprises a conductive agent;
    wherein the conductive agent comprises at least one of single-wall carbon nanotubes, multi-wall carbon nanotubes, vapor grown carbon fiber, conductive carbon black, acetylene black, Ketjen black, conductive graphite, or graphene; and/or a mass percentage of the conductive agent in the active substance layer is 0.1%-5%.

8. The negative electrode plate according to claim 1, wherein a mass percentage of the silicon-based material in the active substance layer is 2%-40%.

9. The negative electrode plate according to claim 1, wherein a mass percentage of the silicon-based material in the active substance layer is 40%-80%.

10. The negative electrode plate according to claim 1, wherein an average particle size of the silicon-based material is 500 nm-10 μm.

11. An electrochemical apparatus, comprising:
    a positive electrode plate;
    a negative electrode plate; and
    a separator disposed between the positive electrode plate and the negative electrode plate;
    wherein the negative electrode plate comprises
    a current collector; and
    an active substance layer provided on the current collector,
    wherein the active substance layer comprises a silicon-based material, and a proportion by mass of element silicon in the active substance layer has a minimum value X1 and a maximum value X2 among different locations of a same area size, wherein a value of X1/X2 is M, and M≥0.7; and
    a weight loss rate of the active substance layer under thermogravimetric (TG) analysis within 800° C. has a minimum value Y1 and a maximum value Y2 among different locations of a same area size, wherein N=Y1/Y2, and N≥0.7;
    wherein in an X-ray diffraction pattern of the silicon-based material, the highest intensity at 2θ within the range of 20.5°-21.5° is $I_1$, and the highest intensity at 2θ within the range of 28.0°-29.0° is $I_2$, wherein $0<I_2/I_1 \leq 1$.

12. The electrochemical apparatus according to claim 11, wherein a mass percentage of the silicon-based material in the active substance layer is 2%-40%.

13. The electrochemical apparatus according to claim 11, wherein a mass percentage of the silicon-based material in the active substance layer is 40%-80%.

14. The electrochemical apparatus according to claim 11, wherein an average particle size of the silicon-based material is 500 nm-10 μm.

15. An electronic apparatus, comprising the electrochemical apparatus according to claim 11.

* * * * *